US008535461B1

(12) United States Patent
Godbehere (10) Patent No.: US 8,535,461 B1
(45) Date of Patent: Sep. 17, 2013

(54) MELTED HOT GLUE SYSTEM FOR APPLYING BROADCAST SOIL FUMIGATION FILM TO AN AGRICULTURAL FIELD

(76) Inventor: John Stephen Godbehere, Grady County, GA (US)

( * ) Notice: Subject to any disclaimer, the term of this patent is extended or adjusted under 35 U.S.C. 154(b) by 643 days.

(21) Appl. No.: 12/321,319

(22) Filed: Jan. 16, 2009

(51) Int. Cl.
*B32B 37/12* (2006.01)

(52) U.S. Cl.
USPC .............. 156/71; 156/546; 156/577; 111/118

(58) Field of Classification Search
USPC ........ 156/71, 544, 546, 574, 577; 47/1.01 F; 405/129.45, 129.75, 129.9; 111/118
See application file for complete search history.

(56) References Cited

U.S. PATENT DOCUMENTS

| | | | | |
|---|---|---|---|---|
| 4,050,972 A | * | 9/1977 | Cardinal, Jr. ..................... | 156/71 |
| 4,513,530 A | * | 4/1985 | Nyboer ................................ | 47/9 |
| 4,725,328 A | * | 2/1988 | Arnold ....................... | 156/380.9 |
| 4,834,827 A | * | 5/1989 | Obeda ........................... | 156/352 |
| 5,226,376 A | * | 7/1993 | Shaw ............................. | 111/144 |
| 5,863,153 A | * | 1/1999 | Bachell et al. ............. | 405/129.9 |
| 6,484,781 B2 | * | 11/2002 | Weaver .......................... | 156/577 |
| 6,558,079 B1 | * | 5/2003 | Kozak et al. ............. | 405/129.15 |
| 6,866,732 B2 | * | 3/2005 | Hubbard et al. ................. | 156/71 |

\* cited by examiner

*Primary Examiner* — Mark A Osele
(74) *Attorney, Agent, or Firm* — William E. Noonan (57) ABSTRACT

A method and apparatus are provided for installing types of broadcast fumigation film, such as LDPE, HDPE, TIF and VIF, over a field treated with a fumigant. An elongate first film strip is extended across the field, with simultaneous fumigant injection under the film and a melted hot glue adhesive is applied to the first strip along a trailing longitudinal edge thereof. An elongate second film strip is applied across the field and juxtaposed across the first film strip with a leading longitudinal edge of the second film strip overlapping the trailing longitudinal edge of the first strip. The leading longitudinal edge of the second strip is pressed against trailing longitudinal edge of the first strip to adhesively interengage the first and second strips along a seam that joins the strips together.

7 Claims, 5 Drawing Sheets

MELTED HOT GLUE SYSTEM FOR APPLYING BROADCAST SOIL FUMIGATION FILM TO AN AGRICULTURAL FIELD

FIELD OF THE INVENTION

This invention relates to a method and apparatus utilizing hot melt glue to seam adjacent strips of soil fumigation film in order to form a solid/broadcast tarp or film for covering a fumigated agriculture field.

BACKGROUND OF THE INVENTION

Agricultural crops are quite susceptible to various types of diseases and damage from soil borne pathogens and subterranean pests, such as nematodes, weeds, fungi, bacteria and insects. To combat such problems, the soil in which the crops are to be planted is commonly treated by a suitable soil fumigant. Such fumigants are volatile products that disperse rapidly through the soil profile to eradicate subterranean pests.

Land to be planted in high value crops is typically first fumigated and then promptly covered with a suitable plastic fumigation film. Such film is designed to retain the fumigant within the planted ground for as long as possible so that the fumigant works most effectively. If a planted field is left uncovered, volatile fumigants are apt to evaporate rapidly into the atmosphere. This tends to significantly reduce the effectiveness of the fumigation. Conventional fumigation films and tarps retard fumigant evaporation so that improved pest eradication is achieved. When crops are planted in rows or beds, the fumigation film is typically applied in disconnected parallel strips, which cover the respective rows. Alternatively, when broadcast fumigation of an entire field is required, a continuous tarp or film must be applied to cover the entire field. This is conventionally accomplished by laying successive plastic strips across the field and sealing the adjoining strips together so that a solid/continuous tarp is formed over the planted crops. In such cases, it is critical that the adjoining strips of film be securely joined to one another. Otherwise, wind is apt to separate the seams and fumigant dissipates into the atmosphere.

Low density polyethylene film (LDPE) and high density polyethylene film (HDPE) have long been used in the fumigation of agricultural fields. When broadcast fumigation is performed, adjoining LDPE or HDPE strips are normally fastened together by an adhesive containing a high percentage of volatile hydrocarbon solvents, also known as volatile organic concentrates (VOC's). When such adhesives are used with LDPE film, they typically achieve tack and are capable of adhering the adjoining strips together within 15-30 seconds. These adhesives tack due to evaporation of the solvent from the adhesive. Nonetheless, LDPE and HDPE polyethylene film tend to be undesirably permeable to many fumigants. Such fumigants can dissipate through the film and move off of the treated field. This significantly reduces the effectiveness of the fumigant and/or greatly increases treatment costs. Recently, virtually impermeable film (VIF) has been adopted for use in the United States and is quickly becoming the standard for row or bed fumigation. VIF film is far less permeable to fumigants than traditional polyethylene film. Unfortunately, VIF film is so impervious that the solvent in standard solvent based adhesives cannot quickly evaporate through the film and adhesive tack. When VOC adhesive is used to join together an adjoining pair of VIF strips, the adhesive requires an undesirably lengthy time to tack sufficiently to secure the strips together. Because the adjoining strips take too long to adhere securely to one another, even a slight amount of wind can cause the adjoining film strips to separate. This, in turn, allows fumigant to escape from the field and through the broken seam of the tarp. Effective fumigation and pest control are therefore frustrated.

Despite their superior fumigant retention capabilities, VIF film, and even more impervious fumigation film known as totally impermeable film (TIF) have not, to date, been adopted for broadcast or solid tarp fumigation. These films simply do not allow currently available high solvent adhesives to tack and seam the film quickly enough to adequately retain the fumigant within the treated soil for proper pest eradication.

In addition to being effectively unusable with VIF and TIF film, conventional high solvent adhesives are also environmentally unfriendly. The use of such adhesives is restricted in certain areas due to governmental regulations that limit the amount of VOCs that can be employed in a given area.

SUMMARY OF THE INVENTION

It is therefore an object of the present invention to provide a system for quickly and effectively forming a highly preventative broadcast fumigation film employing impervious seams that restrict fumigant from dissipating into the atmosphere so that the effectiveness of the fumigation process is significantly improved and offsite movement of fumigant applied to an agricultural field is drastically limited.

It is a further object of this invention to provide a method of forming a broadcast fumigation film by conveniently joining together strips of all types of known fumigation film, including LDPE, HDPE, VIF and TIF film, through the use of an effective, environmentally friendly and easy to apply pressure sensitive hot glue adhesive process.

It is a further object of this invention to provide a melted hot glue system for seaming broadcast fumigation film, which permits highly impermeable film such as VIF and TIF film to be utilized quite effectively for the first time in a solid/continuous tarp for broadcast soil fumigation applications.

It is a further object of this invention to provide a melted hot glue system for seaming or joining a broadcast soil fumigation film, which avoids the use of volatile solvents and yet which still achieves prompt tacking and adhesion, even between adjoining strips of VIF and TIF film.

It is a further object of this invention to provide a method of seaming fumigation film, which yields tight and effective seams that resist wind separation and resultant fumigant loss from a treated field.

It is a further object of this invention to provide a melted hot glue adhesive system for broadcast fumigation film, which allows such film to be assembled and installed either manually or using a tractor and other readily available equipment to achieve extremely effective fumigant retention in an agricultural field.

It is a further object of this invention to provide a system for effectively assembling a broadcast fumigation film composed of LDPE, HDPE, VIF or TIF film.

It is a further object of this invention to provide a melted hot glue adhesive system for broadcast fumigation film, that may be utilized effectively in a wide range of settings including agricultural fields, golf courses (green, tees and fairways), athletic fields, ornamental plantings, etc.

It is a further object of this invention to provide a system of forming a broadcast fumigation film, that significantly reduces the need to use environmentally unfriendly chemical solvents while also reducing unwanted dissipation of the fumigant from a treated area.

This invention results from a realization that a more effective broadcast fumigation tarp that significantly reduces fumigant dissipation may be assembled using impervious VIF and TIF film strips that are joined by a hot melt glue adhesive. Such adhesive eliminates the need to use standard solvent based adhesives, which are generally ineffective for use in joining VIF and TIF strips.

This invention features a method of installing a broadcast fumigation film over an agricultural field treated with a fumigant. A plurality of elongate film strips are successively extended across the field such that the strips are longitudinally juxtaposed in a substantially parallel pattern wherein each adjacent pair of strips overlaps along respective longitudinal edges. A melted hot glue adhesive is applied between the overlapping longitudinal edges in each adjacent pair of strips. The overlapping edges of the strips are pressed together to adhesively interengage the adjacent strips along respective seams, which join the strips together.

In a preferred embodiment, an elongate first film strip is extended across the film and the melted hot glue adhesive is applied to the first film strip along a trailing longitudinal edge thereof. An elongate second film strip is extended across the field and juxtaposed beside the first film strip with a leading longitudinal edge region of the second strip overlapping the trailing longitudinal edge of the first strip. The leading longitudinal edge of the second strip is then pressed against the trailing longitudinal edge of the first strip to adhesively interengage the first and second film strips along a seam that joins the strips together. Each strip may be extended across the field by unwinding the strip from a roll of film. The hot glue adhesive is sprayed onto the trailing longitudinal edge of the first film strip.

The method is especially advantageous for use in joining juxtaposed strips of virtually impermeable' film (VIF) and totally impermeable film (TIF). The method may also be used for joining together adjacent strips of low density polyethylene film (LDPE) and high density polyethylene film (HDPE) to form a continuous fumigation tarp or broadcast fumigation film.

The invention also features an apparatus for installing a broadcast fumigation film in accordance with the foregoing method. The apparatus includes a tractor or other vehicle for making a series of generally parallel passes in a successive alternating directions across adjacent, generally parallel rows of the field. A dispensable roll of fumigation film is drawn behind the vehicle, whereupon each pass of the vehicle, a free end of the film is fixed relative to the field and the vehicle is moved across the field to unwind and dispense a respective elongate strip of the film onto the field. The vehicle thereby dispenses, in a series of passes across the field, a juxtaposed succession of elongate strips of film having overlapping longitudinal edges. There is a supply of hot melt glue adhesive mounted on the vehicle. A carriage is attached to and driven by the vehicle. The carriage transversely spans the roll of film being dispensed. A pair of glue applicators are carried proximate respective ends of the carriage. There are means for conducting the hot melt glue adhesive from the adhesive supply to the glue applicators. Control means are provided for alternately activating the glue applicators on respective successive passes of the vehicle across the field. This supplies the hot glue adhesive to a trailing longitudinal edge of a previously dispensed strip of film. A succeeding juxtaposed strip of film is unwound as the vehicle moves across the field and dispensed onto the field such that a leading longitudinal edge thereof overlaps the trailing longitudinal edge of the previously dispensed strip to which adhesive has been applied. A pressure applicator is supported by a carriage for pressing the overlapping longitudinal edges of the juxtaposed strips of film together to adhesively interengage those strips along a seam that joins the strips together.

The apparatus may also include a generator or other electrical current source for heating and controlling the hot melt glue adhesive. A pneumatic pressure source may be communicably connected to at least one of the adhesive supply and the glue applicators. A solenoid valve may be interconnected between the adhesive supply and the glue applicator. The solenoid may be responsive to the control means for selectively opening to deliver hot melt glue from the adhesive supply to the applicator and closing to restrict the transmission of hot melt glue from the adhesive supply to the applicator.

DETAILED DESCRIPTION OF PREFERRED EMBODIMENTS

Other objects, features and advantages will occur from the following description of a preferred embodiment and the accompanying drawings, in which.

Figure 1:
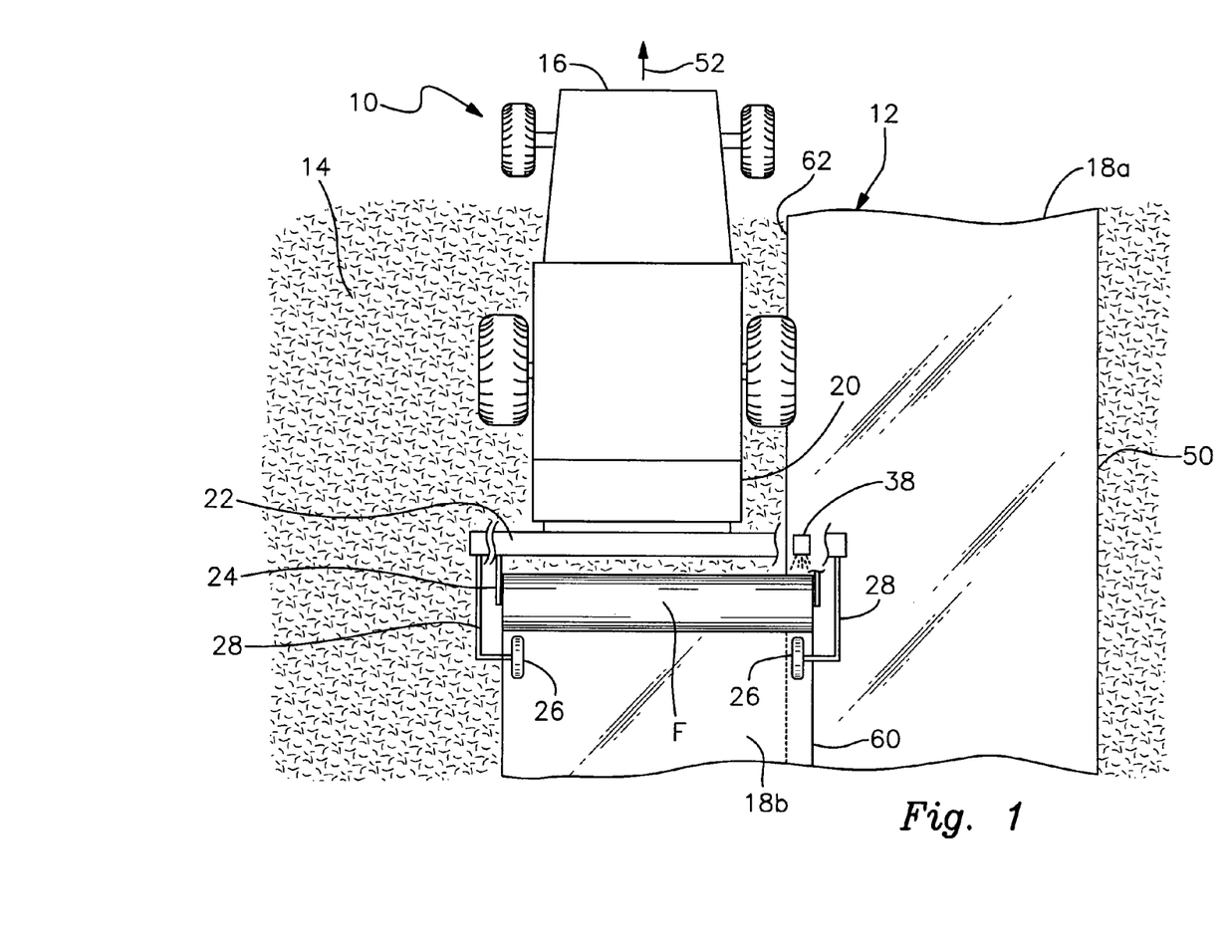
FIG. 1 is a simplified plan view of an apparatus for installing broadcast fumigation film in accordance with the method of this invention.
Figure 2:
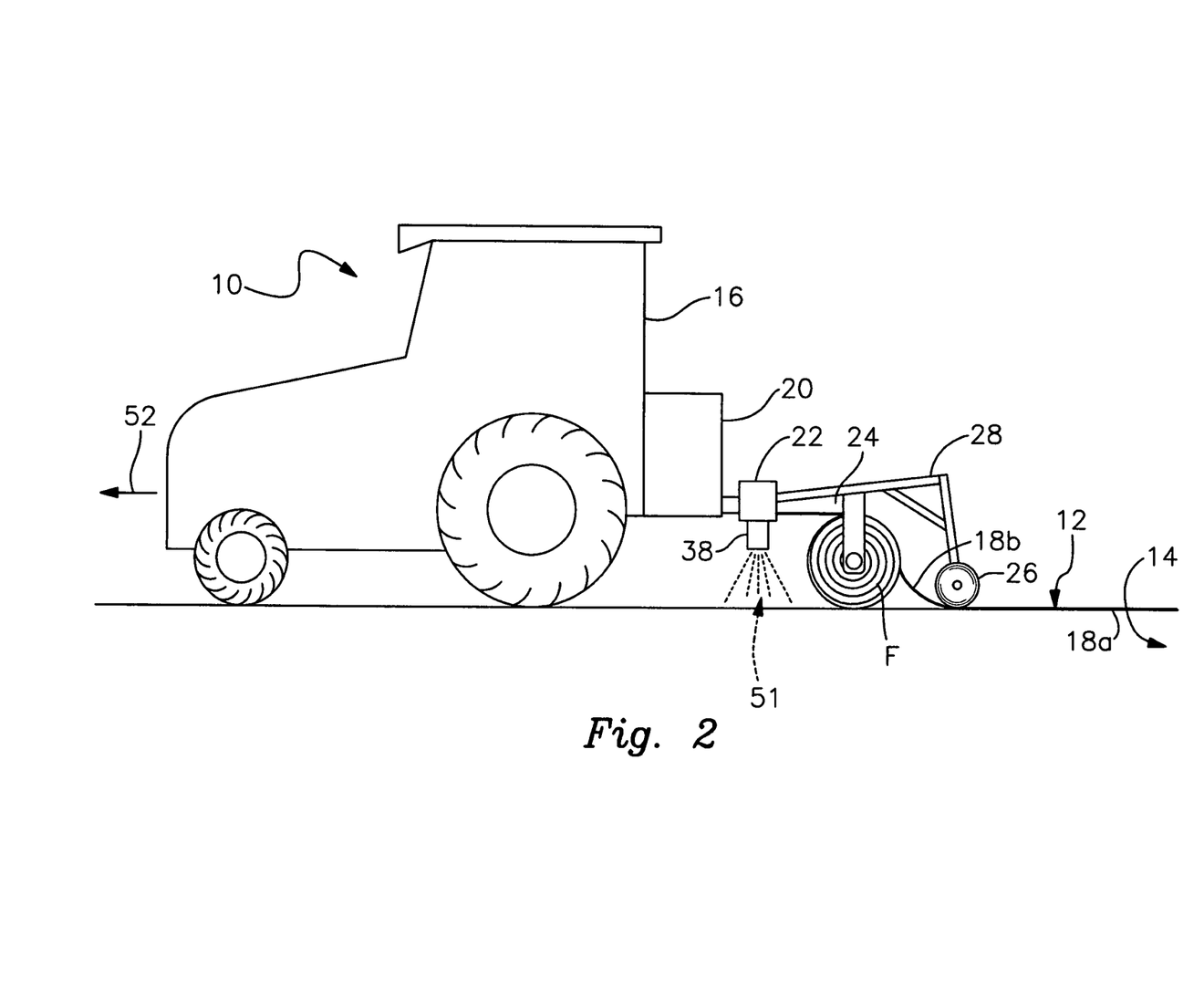
FIG. 2 is a side elevational view of the apparatus installing broadcast fumigation over a field treated with a fumigant.

There is shown in FIGS. 1 and 2 an apparatus 10 for assembling and installing a broadcast fumigation film or tarp 12 over an agricultural field 14 that is simultaneously being treated with a fumigant. It should be understood that the apparatus and method of this invention may be utilized effectively in connection with the fumigation of all types of agricultural fields and other planted areas to be fumigated. For example, the system of this invention may be employed to achieve effective fumigation of golf courses, athletic fields, ornamental plantings, nurseries, etc. The method and apparatus of the invention are especially effective for producing and installing a broadcast fumigation film or tarp 12. The invention advantageously permits the use of highly impervious TIF and VIF film for broadcast fumigation.

Apparatus 10 features a tractor or similar agricultural vehicle 16 that is driven back and forth in successive parallel passes across field 14 to dispense successive strips of plastic fumigation film 18a, 18b, etc. over the field. It should be understood that the method and apparatus of this invention may be practiced with various known types of fumigation film including previously used LDPE and HDPE film. The invention is also particularly effective for the first time in applying TIF and VIF film, which feature an advantageous high degree of impermeability that severely limits undesirable dissipation of fumigant from the field. Tractor 16, itself, may comprise any of various known types of machines that are suitable for use in agricultural, landscaping and similar applications. The particular details of the tractor or other vehicle 16 are not limitations of this invention.

Tractor 16 includes a trailing portion 20 that houses, carries or otherwise supports assorted equipment utilized in the hot melt glue adhesive system of this invention. Such equipment is described more fully below. As depicted in FIGS. 1 and 2, portion 20 of tractor 16 pulls (through a conventional drawbar, hitch or other form of connection) a carriage 22 that transversely spans the tractor and each row that the vehicle traverses during a respective pass across the field. Carriage 22 supports, proximate respective opposite ends thereof, a pair of hot melt glue applicators 38 used in the process of this invention. Only one applicator is depicted in FIGS. 1 and 2. In addition, carriage 22 pulls a dispensable roll of plastic fumigation film F that is attached to carriage 22 by a pair of brackets 24 that extend rearwardly from carriage 22. Film roll F is axially rotatably mounted on a spindle that is interconnected between the opposing brackets 24.

A pair of pressure roller wheels 26 are likewise connected to respective ends of carriage 22 by respective mounting arms 28. These rollers operate to press together adjacent strips of film after glue has been applied in a manner described more fully below.

The various components of the film dispensing mechanism including the carriage, the film roll and the pressure rollers may be structurally varied within the scope of the invention. Alternative types of structure may be used to support the adhesive applicators and the film strips. Likewise other varieties of pressure applying mechanisms may be utilized.

Figure 3:
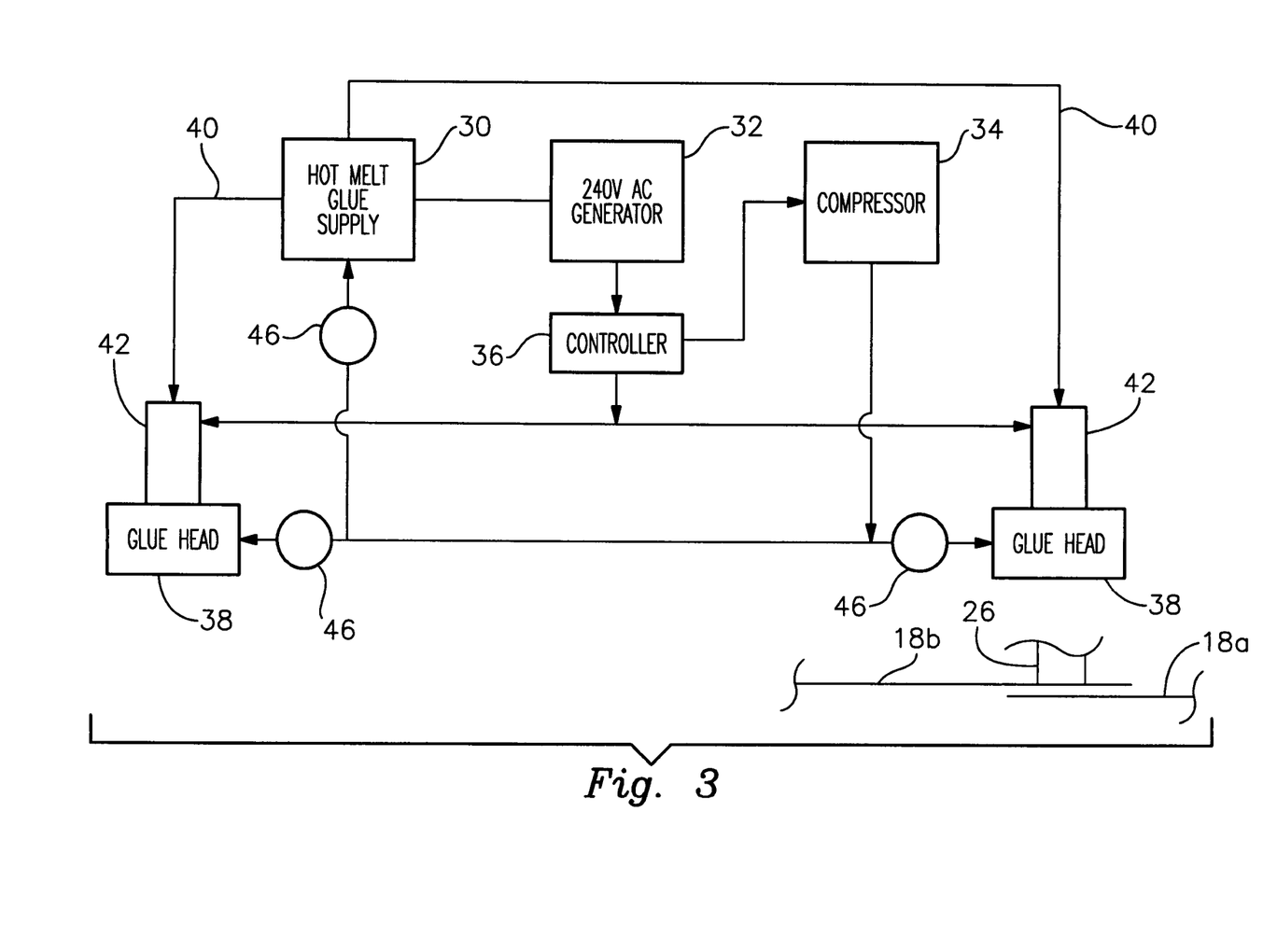
FIG. 3 is a schematic view of the key components of the apparatus.

The most significant components of the hot melt glue adhesive system are shown schematically in FIG. 3. A hot melt glue supply 30, as well as a 240 volt AC generator 32 and an air compressor 34 are mounted on rearward portion 20 of tractor 16. A microprocessor based control circuit 36 for controlling application of hot glue to the dispensed film is likewise mounted on rearward portion 20. Each of these components may comprise various types of known equipment, which will be well understood to persons skilled in the art.

Figure 4:
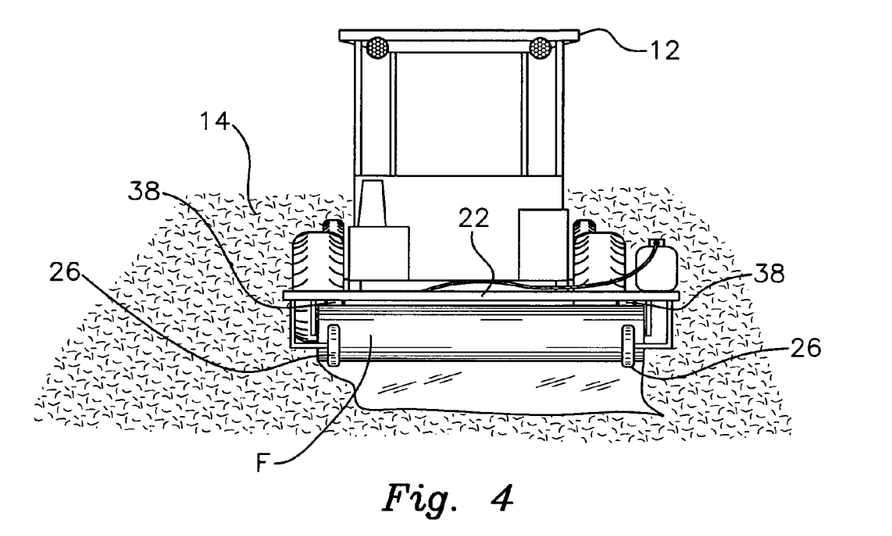
FIG. 4 is a rear elevational view of the apparatus.

Generator 32 produces electrical current and resultant heat to melt the hot melt glue in adhesive supply 30. Various conventional types of hot melt glue adhesive may be utilized within the scope of this invention. Air compressor 34 is typically mounted to the standard power take-off unit of tractor 16. Compressor 34 provides pneumatic pressure to both glue supply 30 and glue head applicators 38, which are, in turn, mounted proximate respective ends of carriage 22 as shown in FIGS. 1, 2 and 4. Such applicators effectively resist vibration and the abuse to which they are subjected as the carriage is pulled across the field and glue is dispensed during the fumigant film assembly process. The glue applicators 38 may comprise various known types of hot glue heads and systems such as those manufactured by Nordson®.

Glue supply 30 is communicably connected to glue heads 38 through respective glue lines 40, which may comprise hoses, pipes or similar conduits. Each glue line 40 is joined to respective glue head 38 through a solenoid 42. The solenoids are operated by controller 36 so that the glue heads 38 dispense adhesive in accordance with the process of this invention and in the manner described more fully below.

Generator 32 provides power to melt the glue in glue supply 30. It also provides power to controller 36. The compressor 34 provides pneumatic pressure to glue heads 38 and glue supply 30 through respective pneumatic regulators 46. The air provided by compressor 34 allows the glue heads to spray in an effective swirl pattern as described more fully below. The compressor also provides pneumatic pressure to an air powered piston type glue pump (not specifically shown) that is an internal part of glue supply 30 so that hot melt glue is pumped to the glue heads as needed. Apparatus 10 is preferably utilized to assemble and install fumigation film having an exceptionally low fumigant permeability such as TIF and VIF film in accordance with the following operation. Preliminarily, field 14, FIGS. 1, 2, 4 and 5, is treated with a selected broadcast fumigant, which is typically dispensed in a known fashion beneath the surface of the field. Tractor 16, which is equipped with the roll of film F and the glue application equipment previously described, then performs successive parallel passes across field 14, each time dispensing a respective strip of film. Initially, a distal edge of film roll F is secured proximate or along an edge of the field to be covered. The film is fastened in place by various known means of attachment, not shown. Tractor 16 then proceeds to make an initial pass across the field so that a first strip of film 18a, FIG. 1, is dispensed (unwound) from the roll and extended across the field behind the tractor. When tractor 16 reaches the end of its initial pass, the dispensed strip 18a is transversely cut from the remainder of film F. A leading longitudinal edge 50 is then tucked into the field and thereby sealed in the field in a conventional manner.

Tractor 16 next reverses direction and makes a second pass across field 14. Indeed, in FIGS. 1 and 2, tractor 16 is shown traveling in a reverse direction as it makes a second pass across the field, as indicated by arrow 52. Once again, as the tractor commences a second pass across the field, the free or distal end of film F on the rolled supply of film is secured in place adjacent to the field. Tractor 16 then pulls the film so that a second juxtaposed strip 18b is unwound from the roll and extended across the field and juxtaposed beside initial strip 18a. More particularly, the tractor is positioned for the second pass such that a leading longitudinal edge 60 of strip 18b overlaps the trailing longitudinal edge 62 of previously dispensed strip 18a.

As tractor 16 commences its second pass across the field, the adhesive application system depicted in FIGS. 1-3 is operated to adhesively interengage the juxtaposed strips of film 18a, 18b. In particular, controller 56 directs just the right-hand solenoid 42 to open and causes hot melt glue to be pumped from adhesive supply 30 through line 40 to the glue head 38 located on the right-hand side of carriage 22, as depicted in FIGS. 1 and 3. Pressure from the air driven piston glue pump supply 30 causes hot melt glue adhesive to be sprayed, as shown by 51, FIG. 2, from that applicator 38 onto the upper surface of film strip 18a along trailing longitudinal edge 62 thereof. See FIGS. 1 and 2. As the tractor proceeds in the direction of arrow 52 across this pass of the field, the glue adhesive is sprayed in this manner progressively along the trailing longitudinal edge 62 of strip 18a. At the same time, film F is unwound from the film roll as a second succeeding film strip 18b, which has a leading longitudinal edge 60 that overlaps the trailing longitudinal edge 62 to which adhesive has already been applied. See FIGS. 1 and 2. Almost immediately after each increment of film strip 18b is dispensed from film roll F, the right-hand pressure roller 26 presses downwardly on the leading longitudinal edge 60 of dispensed strip 18b. This presses the overlapping edges 60 and 62 of respective strips 18b and 18a together so that the adjoining film strips are adhesively interengaged along a seam. As adhesive is sprayed onto the previously dispensed strip, the pneumatic pressure supply to the glue head provides the spray 51 with a swirl pattern that effectively distributes the hot melt adhesive onto the previously dispensed film. This allows the adhesive to tack quickly so that the juxtaposed and interengaged strips bond securely together almost immediately when pressure roller 26 is applied.

When the tractor reaches the end of its second pass, a continuous longitudinal seam is formed between the adjoining strips 18a and 18b. The hot melt glue adhesive tacks quickly and permanently joins the adjoining strips together along respective seams to form a continuous fumigation film or tarp. See seam S between strip 18b and succeeding strip 18c in FIG. 5. The seam is extremely tight and does not permit the adjoining strips to blow apart or separate. The seam also prevents fumigant from dissipating between the strips and into the air.

After the second pass is completed, the second film strip is again transversely cut and the ends tucked under the soil. Subsequently, the tractor may make as many successive passes as are required to form a continuous broadcast fumigation film that is large enough to cover the treated field. On each successive pass, the glue applicator and film dispensing apparatus operate in a manner analogous to that previously described. During each succeeding pass, only one of the applicators is operated (i.e. the applicator located above the seam between the previously dispensed strip and the strip being dispensed). Controller 36 maintains the solenoid for the other applicator closed so that no glue is dispensed from that glue head. For example, if tractor 52 makes a third pass across the field (i.e. in the direction opposite to that shown in FIGS. 1-3) the glue applicator (obscured) located at the left-hand end of carriage 22 in FIG. 1 (see also the left-hand applicator in FIG. 3) is operated so that the leading end of the third dispensed strip of film is adhesively secured to the trailing end of strip 18b in a manner analogous to that by which strip 18b is joined to strip 18a. At the same time, the applicator shown as operating in FIGS. 1 and 2, is effectively shut off during the third pass. The glue applicators continue to operate in an alternating manner during successive passes across the field. As previously indicated, during the initial pass of the tractor across the field, neither glue applicator operates so that glue is not dispensed during that pass.

Figure 5:
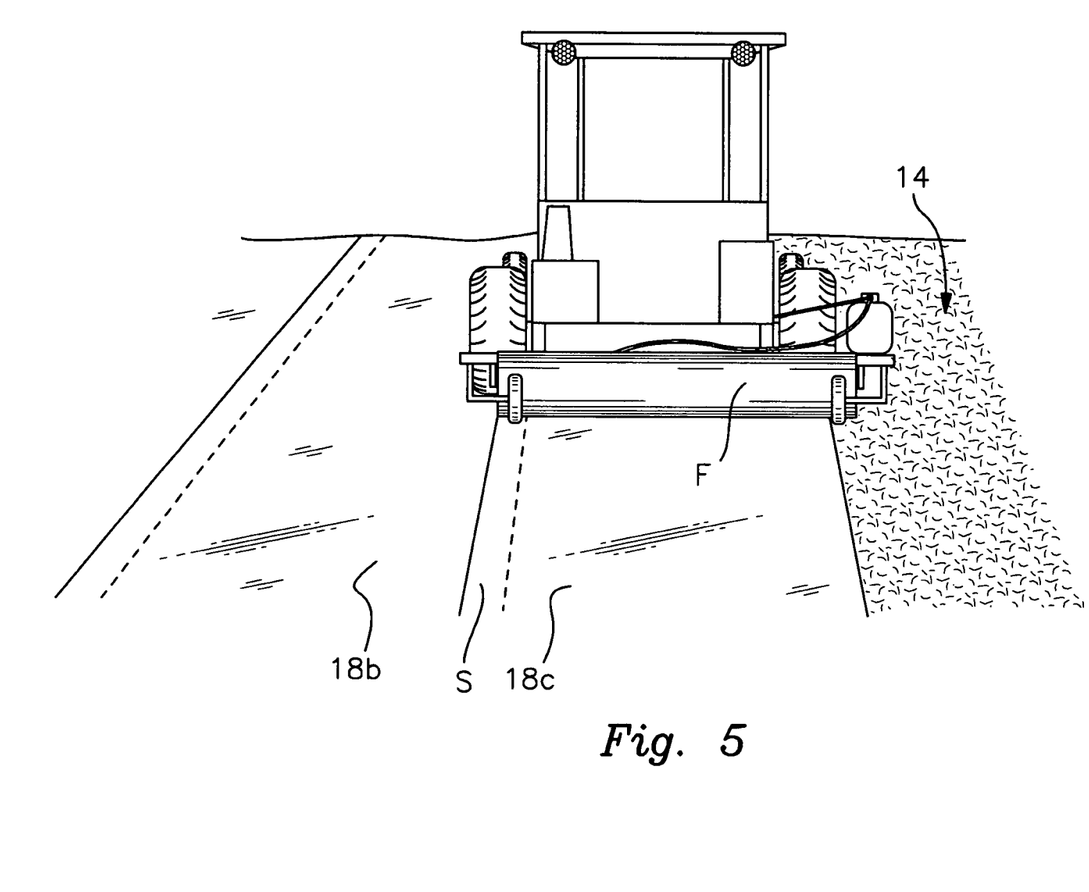
FIG. 5 is a perspective view that shows the use of the apparatus to install VIF film over a field that has been fumigated.

When a final pass is made across the field, the trailing longitudinal edge of the last strip of film is tucked and sealed into the field in a standard manner. This completes the assembly and installation of broadcast fumigation tarp 12. A solid, unbroken broadcast film 12 is thereby formed as shown in FIG. 5. The completed tarp effectively retains the previously applied fumigant within the field so that effective fumigation and pest eradication are achieved.

The process of the present invention is especially effective because it permits highly impermeable plastic such as VIF and TIF film to be utilized in broadcast fumigation applications. This process eliminates the use of high solvent adhesives which can tack quickly only when fairly permeable plastics such as HDPE and LDPE are used. The present invention eliminates the use of such environmentally problematic adhesives and instead employs an environmentally benign hot melt glue adhesive that tacks quickly even in the presence of VIF and TIF film. For the first time, these effective types of dissipation resistant films may be used in broadcast fumigation applications. Because the adhesive tacks fairly quickly and allows the adjoining strips of VIF/TIF to promptly bond along respective seams, the adjoining strips are far less apt to blow apart or otherwise separate. For example, as shown in FIG. 5, a tight impermeable seam S is formed between strips 18b and 18c. There is thus much less chance that the applied fumigant will dissipate into the air and be less than optimally effective. Much improved control of targeted pests is thereby achieved. Moreover, because less fumigant is wasted, a smaller, more cost effective amount of the fumigant can be used to effectively treat a field. As a result, the process of this invention provides for improved crop yields, healthier plantings, cost savings and significant environmental benefits.

It should also be noted that adjacent strips of film may be joined manually rather than using the above described machine. Successive overlapping strips may be layed across the field and a worker may spray or brush the hot melt glue between the overlapping strips. Pressure is then applied to the overlapping strips to adhesively interengage the overlapping edges. A roller or other tool may be used to generate this pressure. Alternatively, a worker can manually walk across the overlapping edges with glue dispensed therebetween.

From the foregoing it may be seen that the apparatus of this invention provides for a method and apparatus utilizing hot melt glue to seam adjacent strips of soil fumigation film in order to form a solid/broadcast tarp or film for covering a fumigated agriculture field. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A method of installing a broadcast fumigation film over an outdoor agricultural field treated with a fumigant, said method comprising:

unrolling an elongate first strip of fumigant film in a first direction from a wound supply of said fumigant film to extend said first strip of film across the outdoor agricultural field;

applying a melted hot glue adhesive to an upper surface of said first strip of fumigant film along a trailing longitudinal edge thereof;

unrolling an elongate second strip of said fumigant film in an opposite second direction from the rolled supply of film to extend said second strip of film across said outdoor agricultural field with a leading longitudinal edge of said second strip of fumigant film overlapping said trailing longitudinal edge of said first strip of fumigant film, said hot glue adhesive being applied progressively to successive segments of said upper surface of said first strip along said trailing longitudinal edge, said hot glue adhesive being applied to each said successive segment before a corresponding segment of said leading longitudinal edge of said second strip is unrolled from and overlaps said successive segment; and progressively pressing each said successive segment of said trailing edge of said first film strip and said corresponding segment of said leading edge of said second film strip against the underlying agricultural field to adhesively interengage said first and second strips of fumigant along a seam that sealably joins said first and second strips of film together, whereby dissipation of the treating fumigant from the outdoor agricultural field through the fumigation film is resisted.

2. The method of claim 1 in which said first and second film strips include virtually impermeable film (VIE).

3. The method of claim 1 in which said film strips include totally impermeable film (TIF).

4. The method of claim 1 in which said hot glue adhesive is sprayed onto an upper surface of said first strip of fumigant film along said trailing longitudinal edge thereof.

5. The method of claim 4 in which said adhesive is sprayed under pressure in a swirl pattern onto the upper surface of said first strip.

6. The method of claim 1 in which said first and second strips of fumigant film are selected from the group consisting of LDPE, HDPE, VIF and TIF film.

7. A method for performing broadcast fumigation on a selected outdoor agricultural field, said method comprising:
- applying a fumigant to the selected outdoor agricultural field;
- a method of installing a broadcast fumigation film over an outdoor agricultural field treated with a fumigant, said method comprising:
- unrolling an elongate first strip of fumigant film in a first direction from a wound supply of said fumigant film to extend said first strip of film across the outdoor agricultural field;
- applying a melted hot glue adhesive to an upper surface of said first strip of fumigant film along a trailing longitudinal edge thereof;
- unrolling an elongate second strip of said fumigant film in an opposite second direction from the rolled supply of film to extend said second strip of film across said outdoor agricultural field with a leading longitudinal edge of said second strip of fumigant film overlapping said trailing longitudinal edge of said first strip of fumigant film, said hot glue adhesive being applied progressively to successive segments of said upper surface of said first strip along said trailing longitudinal edge, said hot glue adhesive being applied to each said successive segment before a corresponding segment of said leading longitudinal edge of said second strip is unrolled from and overlaps said successive segment; and
- progressively pressing each said successive segment of said trailing edge of said first film strip and said corresponding segment of said leading edge of said second film strip against the underlying agricultural field to adhesively interengage said first and second strips of fumigant along a seam that sealably joins said first and second strips of film together, whereby dissipation of the treating fumigant from the outdoor agricultural field through the fumigation film is resisted.

* * * * *